March 22, 1955     K. F. SCHLICHTING     2,704,378

APPARATUS FOR FILLETING FISH

Filed May 16, 1951     11 Sheets-Sheet 1

INVENTOR.
KARL FRIEDRICH SCHLICHTING
BY
Richards & Geier
ATTORNEYS

March 22, 1955  K. F. SCHLICHTING  2,704,378
APPARATUS FOR FILLETING FISH
Filed May 16, 1951   11 Sheets-Sheet 3

Fig. 4

INVENTOR.
KARL FRIEDRICH SCHLICHTING
BY
Richards & Geier
ATTORNEYS

March 22, 1955  K. F. SCHLICHTING  2,704,378
APPARATUS FOR FILLETING FISH
Filed May 16, 1951  11 Sheets-Sheet 4

INVENTOR.
KARL FRIEDRICH SCHLICHTING
BY
Richards & Geier
ATTORNEYS

March 22, 1955     K. F. SCHLICHTING     2,704,378
APPARATUS FOR FILLETING FISH Filed May 16, 1951     11 Sheets-Sheet 5

INVENTOR.
KARL FRIEDRICH SCHLICHTING
BY
Richards & Geier
ATTORNEYS

March 22, 1955  K. F. SCHLICHTING  2,704,378
APPARATUS FOR FILLETING FISH
Filed May 16, 1951  11 Sheets-Sheet 6

INVENTOR.
KARL FRIEDRICH SCHLICHTING
BY
Richards & Geier
ATTORNEYS March 22, 1955   K. F. SCHLICHTING   2,704,378
APPARATUS FOR FILLETING FISH
Filed May 16, 1951   11 Sheets-Sheet 7

INVENTOR.
KARL FRIEDRICH SCHLICHTING
BY
Richards & Geier
ATTORNEYS

March 22, 1955  K. F. SCHLICHTING  2,704,378
APPARATUS FOR FILLETING FISH
Filed May 16, 1951  11 Sheets-Sheet 8

INVENTOR.
KARL FRIEDRICH SCHLICHTING
BY
Richards & Geier
ATTORNEYS

March 22, 1955  K. F. SCHLICHTING  2,704,378
APPARATUS FOR FILLETING FISH
Filed May 16, 1951  11 Sheets-Sheet 9

INVENTOR.
KARL FRIEDRICH SCHLICHTING
BY
Richards & Geier
ATTORNEYS

March 22, 1955   K. F. SCHLICHTING   2,704,378
APPARATUS FOR FILLETING FISH
Filed May 16, 1951   11 Sheets-Sheet 10

Fig. 20

INVENTOR.
KARL FRIEDRICH SCHLICHTING
BY
Richards & Geier
ATTORNEYS

March 22, 1955 K. F. SCHLICHTING 2,704,378
APPARATUS FOR FILLETING FISH
Filed May 16, 1951 11 Sheets-Sheet 11

INVENTOR.
KARL FRIEDRICH SCHLICHTING
BY
Richards & Geier
ATTORNEYS

United States Patent Office 2,704,378
Patented Mar. 22, 1955

2,704,378

APPARATUS FOR FILLETING FISH

Karl Friedrich Schlichting, Lubeck, Germany, assignor to Nordischer Maschinenbau Rud. Baader, Lubeck, Germany, a firm of Germany Application May 16, 1951, Serial No. 226,567

Claims priority, application Germany May 19, 1950

9 Claims. (Cl. 17—4)

This invention relates to a method and means for treating fish, and refers more particularly to an apparatus for cutting fish bodies into fillets.

An object of the present invention is the provision of an apparatus for treating fish which is so constructed that it is fully adequate to cope with the peculiarities of the product being treated, namely, fish bodies which are quite different in form and shape and which are often sticky and jelly-like.

Another object of the present invention is the provision of a method and means for adequately guiding fish bodies to different locations for the purpose of treating such bodies.

Experience with prior art apparatus has shown that the known methods of guiding fish on their backs or sides in a standing or hanging position, or guiding them circularly, did not attain the desired results since in any of these positions it is not possible to apply the fish-treating tools to the desired part of the fish body, and to enable them to carry out the work in the desired precise manner. Therefore, a further object of the present invention is the provision of an entirely novel process wherein the position of the fish body is radically changed, as compared to prior art, and which enables the operating tools to carry out easily, adequately and precisely all the operations which are or may become necessary.

A further object is to eliminate drawbacks of existing process steps employed in filleting fish.

Other objects of the present invention will become apparent in the course of the following specification.

The present invention is based on the discovery that it is most advantageous to guide the fish body in a stretched condition upon its belly with the tail forward throughout the various stations of the machine. It was found that the guiding of a fish body in this position is most advantageous since it can be carried out easily and securely at a constant height, particularly as far as fish of large size are concerned, while the stretching of the fish body in the course of the treatment effectively eliminates permanent deformation of its form which heretofore was particularly noticeable in the course of prior art circular treatment whereby the stump or the tail end of the fish were bent.

It was further found that by applying the process of the present invention the entire operation can be carried out in an exceptionally precise manner with a considerable saving of the material and, furthermore, that it is possible to solve in a surprisingly light and easy manner many individual problems of fish treatment which had appeared baffling heretofore.

In the first place, the problem of guiding the fish is effectively solved when using the fish body in the belly position and in a stretched condition in that the fish is introduced in a bent form into a holding device perpendicularly to its movement through the machine in such manner that it can be conveniently taken out of the guiding device in the course of the movement. In order to avoid the fish being suddenly pulled out of the guiding device it is advisable that the latter be so arranged that it slightly lags in relation to the holding device.

An important advantage of swinging the tail of the fish from above into the holding device consists in that this will automatically straighten the tail end which is often bent, this being a condition which frequently takes place in the case of fish which are sometimes kept for days pressed against each other in boxes or containers. On the other hand, this makes it possible to hold the fish body properly, which was not the case in prior art constructions, and particularly where the fish was shifted in relation to the holding device.

The fish, which is held by the tail, and then preferably measured for the purpose of facilitating the proper setting of various transporting, guiding and operating devices, is then moved into the machine in such manner that after opening the belly cavity, either in the machine or before its engagement with the tools, the fish is guided by corresponding guiding elements in each moment of the passage through the treating locations, without any danger that it will drop out, the fish being placed upon its lower edge and moving thus past the treating tools. This arrangement, whereby the fish passes through the machine at a constant, unchangeable height, makes it possible to guide the fish from one tool to another in a completely stretched or rigid position so that the tools can be set in a most precise manner and are able to carry out their work exactly.

This possibility of conveniently guiding the fish makes it possible to carry out the cutting of the stump in consecutive operations, namely, to cut first from the side of the belly and then from the back. This separation of the cutting operations into two parts is of particular importance since the two cuts are entirely different, namely, the belly cut extends only from the tail to the beginning of the belly cavity, while the back cut extends from the tail to the head. Thus, when the cuts were carried out simultaneously in prior art there was always the difficulty of providing secure guiding of the back cut after the belly cut was terminated. On the other hand, when the two cuts are carried out consecutively, as in the present invention, the guiding of the tools for each cut can be continuous.

Preferably, the fish is guided in such manner that when the stump is cut out from the side of the belly the fish rides at the same height until the tools reach the tail end of the belly cavity in synchronism from the sides of the belly and the back and thereupon reach it only from the side of the belly with the stump riding upon the guide located at the belly side, while the guide located upon the back side changes its height corresponding to the changing height of the back. It is of advantage at the time of the separation of the synchronous guiding from belly and back to steer the knife, which was set to the desired distance for the purpose of cutting off the bones as a result of the measuring of the fish which took place prior to the treatment, in such manner that neither the stump nor the rib bones located at the side are cut and that a clamping of the stump does not take place.

The straightening of the fins, which is of great importance in order to carry out the process properly, can be carried out in accordance with the present invention most advantageously in that they are unfolded from behind over a joint directly through pressure and are held in a spread-out manner.

The work of the guiding devices and of the operating tools can be further improved by using two or more curves for steering them so that the various operations can be conveniently adapted to the form of the fish and to its size.

To provide a free passage of the holding device with the tail end through the various stations of the machine the latter can be opened by the guiding device itself to provide free passage whereupon they are immediately moved back to their initial or operating positions.

The invention will appear more clearly from the following detailed description when taken in connection with the accompanying drawings showing, by way of example, a machine for filleting large fish constructed in accordance with the present invention.

Figure 1:
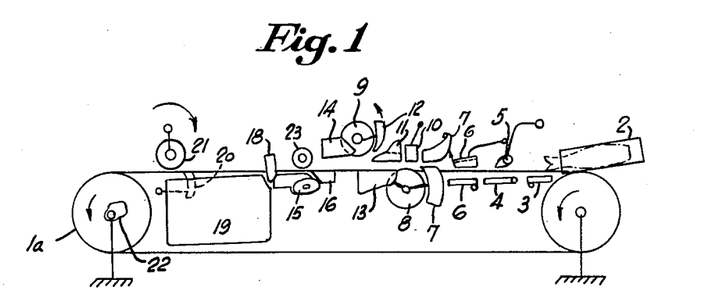
Figure 1 is a diagram illustrating the positions of various most important parts of the machine.

Figure 1 of the drawings is a diagram wherein the various parts of the machine have been illustrated diagrammatically to indicate the various operating stations. It should be noted that Figure 1 does not illustrate the correct form or shape of the machine parts and, in some cases, illustrates several devices which actually constitute a single device.

The machine includes an endless band 1 provided with tail clamps. An inlet trough 2 is located over the top surface of the band 1. Fish held by the tail clamps and introduced into the member 2 are moved to a supporting member 3 which is used to set up the fish and are then moved to an immovable fish-engaging control 4 which is located directly below the measuring apparatus 5. Thence the fish travel to a further supporting device 6 and from there to a double guide 7 which takes over the guiding of the fish during the cutting operation by a disc-shaped pair of knives 8 from the side of the belly while a disc-shaped pair of knives 9 carries out the cutting from the side of the back. Fin stretchers 10 are provided for the back while other fin stretchers (not shown) are used for the belly side of the fish. A fish back guide 11 and a fin holder 12 are further provided between the pair 8 of the belly-cutting knives and the pair 9 of the back-cutting knives. A fillet stretcher 13 is located behind the knife pair 8, while a fillet stretcher 14 is located behind the knife pair 9. A pair 15 of rib-cutting knives is provided for cutting the fish meat from the ribs while the fish is guided from the side of the belly by a guide 16. Then the fish is guided from the side of the belly by a bone guide 17 and is moved to a separating device 18 which separates the meat strips remaining upon the bone skeleton to the side of the back bone over the rib bones. Fillet guides 19 are located next to the separating device 18 and a bone guide 20 engages their end from the side of the belly of the fish while a fillet cutter 21 engages the tail end from the back side for the purpose of cutting off fillet strips from the tail root. A steering device 22 for the guide 16 can be located upon the axle of the rear transport wheel 1a. A pressure device 23 is located above the two knives 15.

Figures 2, 3:
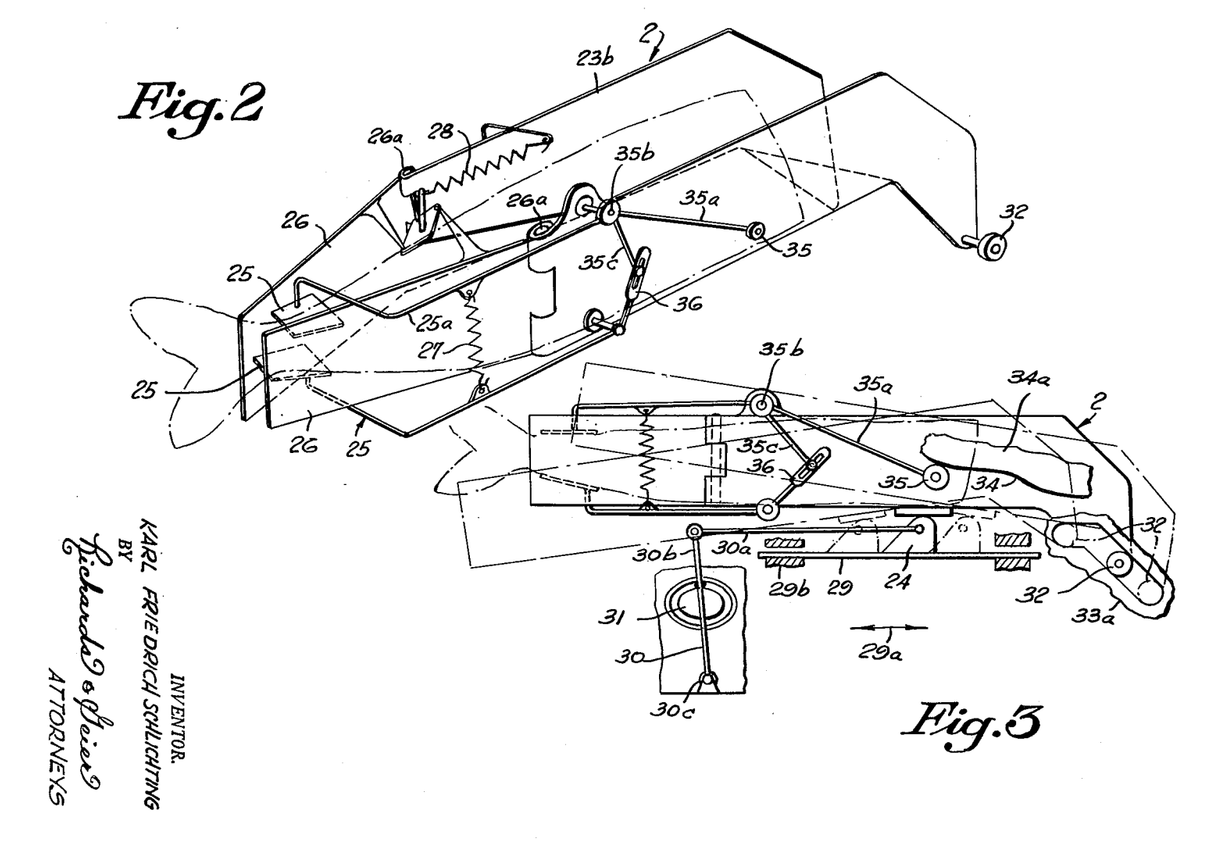
Figure 2 is a perspective view of the fish-introducing device.
Figure 3 is a plan view of the device shown in Figure 2.

The fish-introducing device 2 of Figure 1 is shown in detail in Figures 2 and 3 of the drawings. This device includes an essentially trough-shaped body 23a which cooperates with flaps 25 for guiding the fish in the direction of its height as well as flaps 26 used to guide the fish from the sides. The flaps 25 are coupled with each other by means of wires 25a which are interconnected by a spring 27.

The flaps 26 are hinged at 26a to the walls 23b of the device and are connected with springs 28 which are also attached to the walls 23b. The entire device 2 may be swung upon a support 24 which is mounted on a slide 29. The member 29 may be moved in the directions of the arrow 29a in guides 29b by means of a steering device 30 which includes a rod 30a connected at one end with the support 24 and pivotally connected at the other end with a rod 30b which is swingably mounted at 30c. The steering device 30 cooperates with the curved steering cam 31.

One end of a wall 23b carries a steering roller 32 which is movable within a steering guide 33 consisting of a slot provided in any suitable frame 33a, to swing the device.

Figure 3 illustrates the device 2 in a middle position, the two end positions being indicated by broken lines.

The height flaps 25 are guided by means of an edge 34 provided in any suitable casing part 34a and engaged by a roller 35. The roller 35 is connected by a rod 35a with a roller 35b. The roller 35b is connected by a rod 35c with a coupling device 36 of the height flaps 25.

The device 2 is swung in and out in unison with the movement of the tail clamps which are carried by the belt 1, and are moved along with it.

Figure 4:
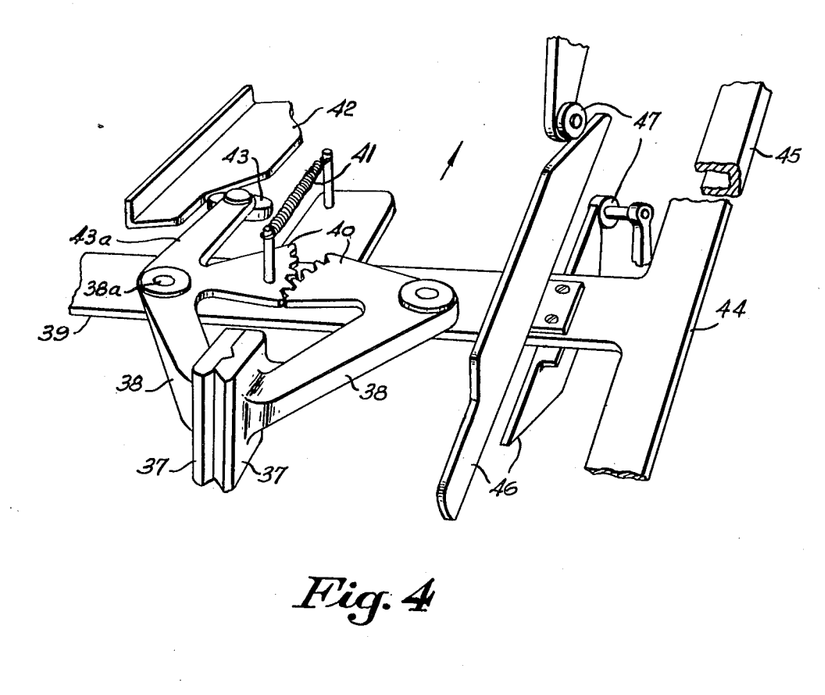
Figure 4 is a perspective view of the holding device.

When the device 2 is in the outward position the fish with its head cut off is placed with the tail forward and the belly downward, and is pushed forward as much as possible. The side flaps 26, which are actuated by the springs 28, and the guide device 35, are synchronized in their movements to the extent that in this outwardly swung position of the device 2 the flaps 26 are substantially closed, leaving between them a narrow passage which suffices for the passage of the fins of the tail, but not for the base of the tail. During this insertion of the fish by the operator, and the resulting swinging of the device 2, the tail end of the fish is raised by the correspondingly synchronized flaps 25 to the middle of the tail clamp. Then, the tail fins will be inserted between the two plates 37 of the tail clamp, which is shown in Figure 4.

The clamps 37 grasp the tail end and pull it out of the device 2.

Thereafter, the device 2 is moved for a short space behind the clamps 37 with decreasing speed.

At the time when the clamps 37 begin to pull the fish out of the device 2, the side clamps 26 are freed, so that they will be affected by their springs and they will guide the fish sidewise and stretch it. At the same time, the synchronism between the two clamps or flaps 25 is eliminated, so that the upper flap can move outwardly and free the path for the fish.

As shown in Figure 4, the clamps holding the tail of the fish consist of two jaws 37, which are connected to two synchronized levers 38. The levers 38 are mounted upon pivots 38a, which are carried upon a carriage 39. The carriage 39 is mounted upon the endless belt 1 in any suitable manner. The levers 38 have extensions 40 which have the form of meshing toothed segments to synchronize the levers. A spring 41 is attached at one end to a segment 40, while the other end of the spring is attached to the carriage 39, to provide closure of the jaws.

The tail-engaging clamps 37 are opened by means of a cam member 42 provided with a curved edge which engages a roller 43 carried by an arm 43a, constituting a part of one of the levers 38.

The cam member 42 is immovable and is attached in any suitable manner to the frame of the machine.

The carriage 39 is integral with inserts 44 located within U-shaped rails 45 of the machine frame, so that the carriage 39 slides on the rails 45.

Cam members 46 are attached to the carriage 39 and are used to operate various tools and to open various guide members while the tail clamps 37 move past them, as will be described in greater detail hereinafter. For this purpose, the guide members and tools carry rollers 47 which engage curved edges of the cam members 46.

Figure 5:
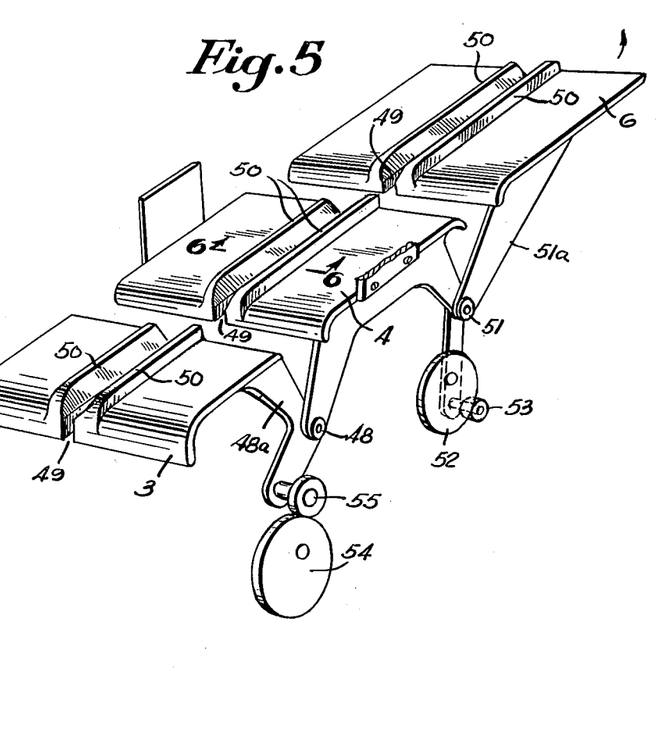
Figure 5 is a perspective view of the fish-supporting device.
Figure 6:
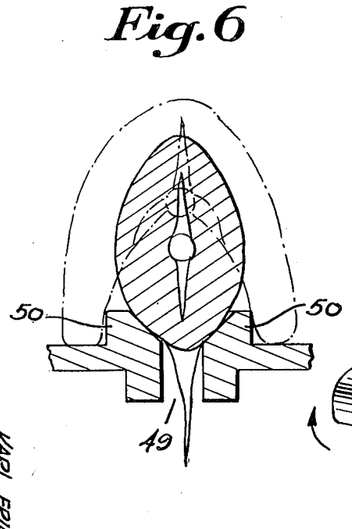
Figure 6 is a partial transverse section through the device of Figure 5, along the line 6—6 of Figure 5, on an enlarged scale illustrating the position of the fish thereon.

As the fish is being pulled out of the device 2, it is raised upward slightly by the support 3. As shown in Figure 5, the support 3 is carried by legs 48a, which are swingably mounted at 48 to the frame of the machine. A free end of the legs 48a carries rollers 55, which engage a cam disk 54. The cam disks 54 are so operated that as the fish body is moved upwardly, the lower flap 25 of the device 2 is freed, and the fish body is prevented from turning over. The fish body is further supported in this position due to the provision of a slot 49, which is adapted to receive the belly fins of the fish as illustrated in Figure 6. The slot 49 has curved upper edges which are formed to conveniently support the sides of the fish body so long as the rear portion of the fish from the tail to the belly cavity extends over the support 3. This portion is shown in full lines in Figure 6. When the belly cavity is moved beyond the support 3, the sides of the fish are supported by the outer surfaces of the guides 50. The position of the fish body while the belly cavity is being moved over the support is shown by broken lines in Figure 6.

A control support 4, which is immovable and which assists in measuring the fish body, is located close to a support 3. As the fish body slides over the support 4, a measuring device 5, which is located above the support 4 (Figure 1), is operated to measure the fish for the purpose of actuating the various devices which will be described in detail hereinafter and the operation of which depends on the size of the fish body. The support 4 has the same slot 49 and the same guides 50 with which the support 3 is provided.

Another support 6 is located next to the support 4. The support 6 is carried upon legs 51a, which are pivoted at 51 to the frame. The support 6 is also provided with a slot 49 and guides 50.

Figure 7:
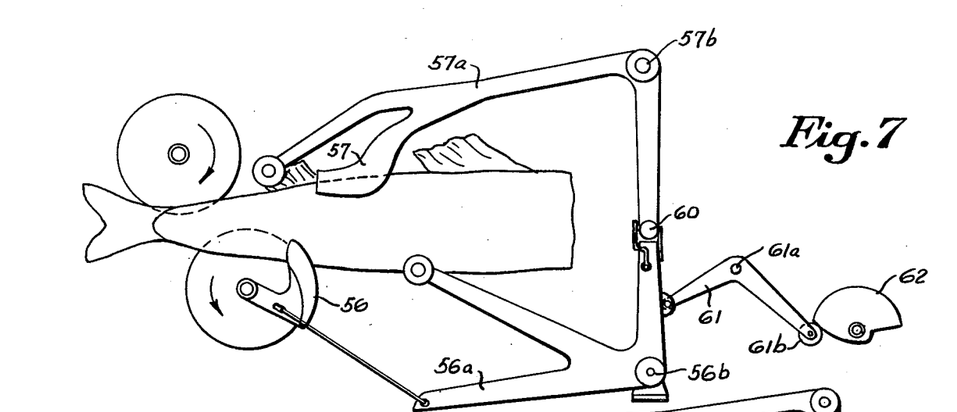
Figure 7 illustrates the guiding device in the course of the belly cut.
Figure 8:
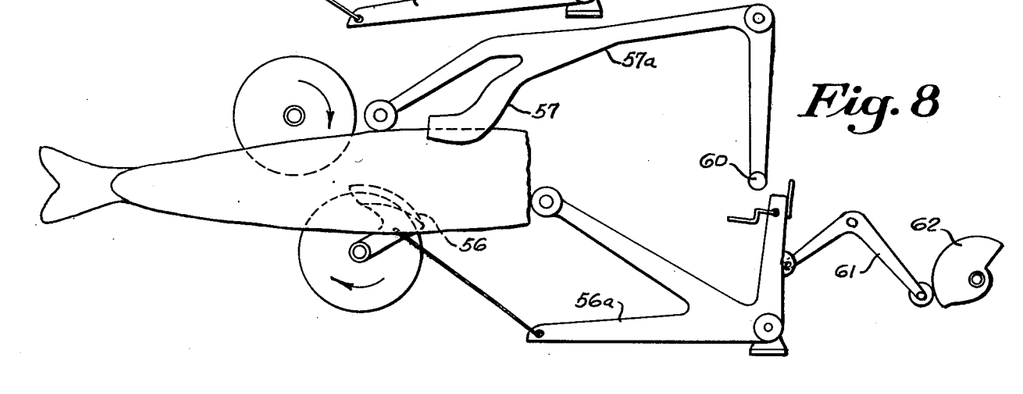
Figure 8 is similar to Figure 7, and shows the device in the course of the back cut.

The support 6 receives the fish body as it comes from the support 4 and holds it stably as it is moved to the double guides 7 shown in Figures 7 and 8. An extension of the leg 51a carries a roller 53 which engages a cam disk 52. The operation of the cam disk 52 is independent of the size of the fish and it is used to move the support 6 downwardly when the fish has reached the double guides 7.

As shown in Figure 5, the three supports 3, 4, 6 may be combined into a single aggregate in such a manner that the immovable support 4 carries the pivots for the swingable supports 3 and 6. The cam disks 54 and 52 used to actuate the supports 3 and 6 may be driven by any suitable means not shown in the drawings.

The double guides shown in Figures 7 and 8 constitute a spanner guide which carries the fish body upon the lower edge as soon as the fish body has been cut from the side of the belly. The double guide which is indicated by the reference number 7 in Figure 1 includes a lower guide 56 which has the form of double roof similar to the cross-sectional outline of the supports 3, 4, 6, and a roof-shaped upper guide 57.

The guides 56 and 57 are connected by arms 56a and 57a, respectively, with a coupling 60. The arms 56a and 57a are pivoted at 56b and 57b, respectively. The coupling 60 is actuated by a steering lever 61, which is pivoted to the frame at 61a and which is provided with a roller 61b engaging a cam disk 62.

In the position shown in Figure 7, the two guides 56 and 57 are guided in synchronism by the coupling 60, which is closed.

The two knives 8 (Fig. 1) cut into the fish body from the tail base to the beginning of the belly cavity. As soon as this cut has been completed, the lower guide 56 is introduced into the belly cavity by the cam disk 62 and the lever 61 so that the fish body is now firmly guided upon the lower edge thereof by the double-deck structure.

Figure 8 shows this position of the lower guide 56 and it is also apparent that as the guide 56 is swung into the belly cavity of the fish body, the coupling 60 is disengaged so that the guide 57 is not subjected any more to the action of the cam 62. Consequently, the guide 57, which is actuated by a spring (not shown) can adapt itself to the curvature of the back of the fish.

In the meantime, the two back knives 9 are operated and cut into the fish from the back (Fig. 1).

Figures 9, 10:
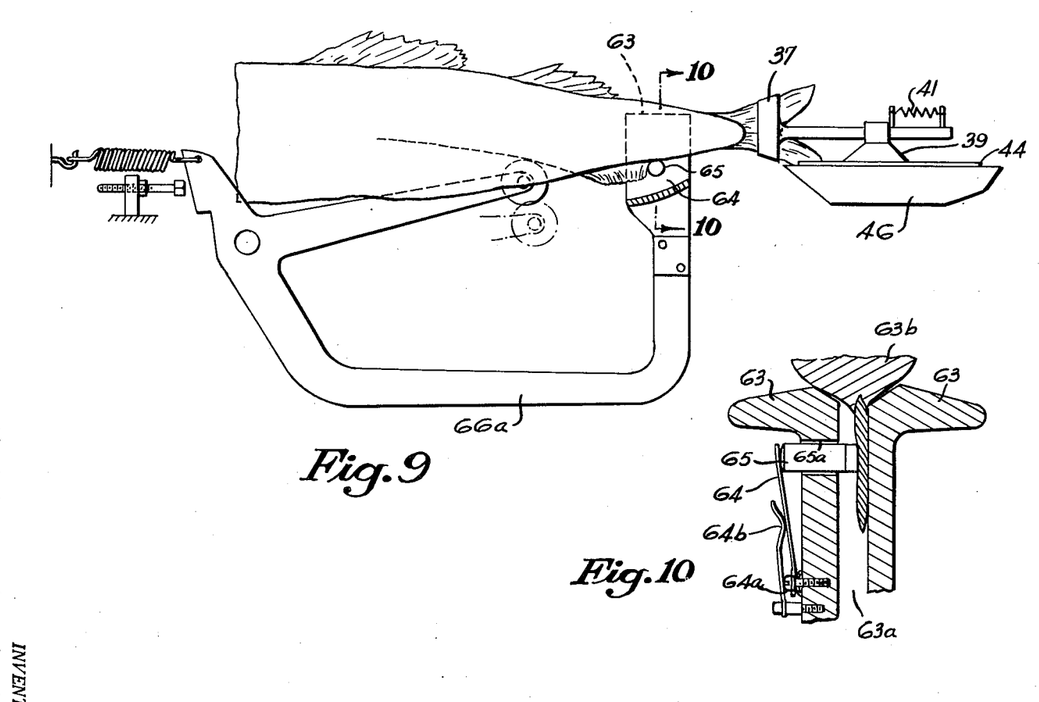
Figure 9 shows the fin stretcher in side elevation.
Figure 10 is a transverse section through the device shown in Figure 9, along the line 10—10 of Figure 9, on an enlarged scale.

A device for straightening the belly fins of the fish is shown in Figures 9 and 10 of the drawings. The device for straightening the fins of the back is the same in all respects and is not shown in detail.

The fin-straightening device includes a T-shaped support 63 provided with an inner slot 63a, having slanting edges 63b. An insert 65 extends through an opening 65a provided in the member 63. The member 65 is engaged by a spring 64, which is attached to the member 63 by a bolt 64a. Another spring 64b presses against the spring 64 and is carried by a bolt 64c, which is mounted in the member 63. This support 63 is carried by an arm 66a, which is swingably mounted upon a pivot 66. The pivot 66 is mounted in the frame of the machine in any suitable manner. One end of the arm 66a is connected to a spring 67, the other end of which is attached to the frame of the machine. The frame also carries an adjustable stop 69, which is adapted to engage this end of the arm 66a.

It should be noted that the straightening of the fins is carried out before the fins are introduced between the knives for the belly or the back of the fish.

Figures 11, 12, 13, 14, 15:
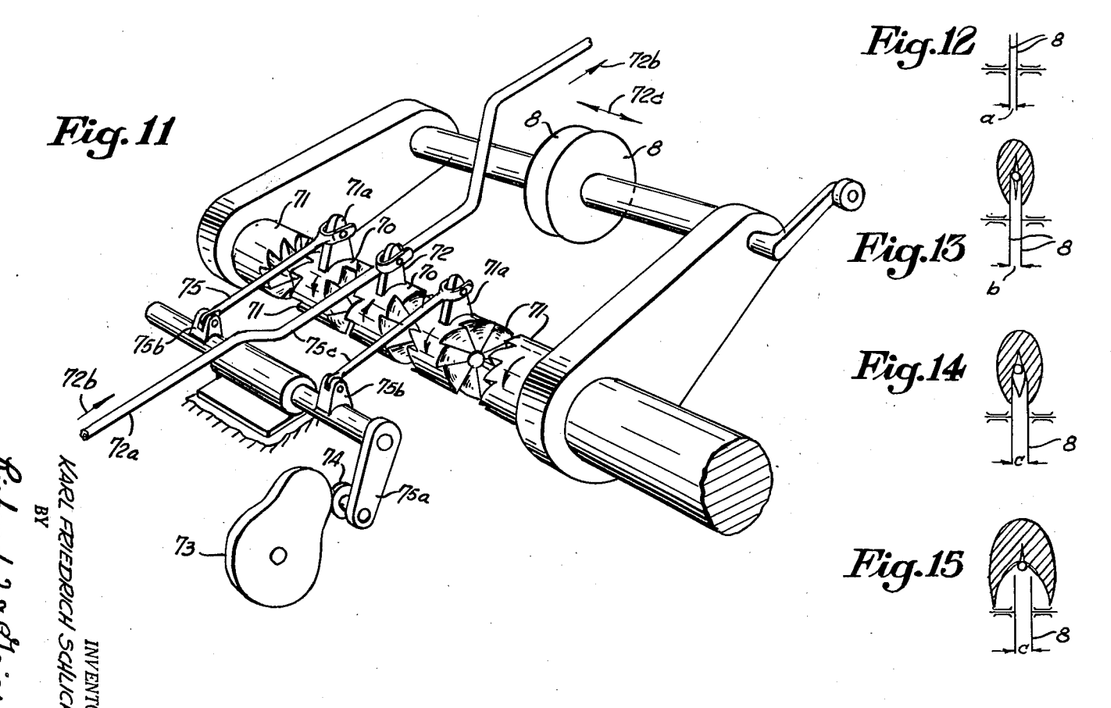
Figure 11 is a perspective view illustrating the device for operating the belly-cutting knife.
Figure 12 is a diagram showing the cutting knife in its rest position.
Figure 13 illustrates diagrammatically the position after the device has been set to the size of the fish.
Figure 14 shows diagrammatically the position prior to the penetration into the belly cavity.
Figure 15 shows diagrammatically the position after the knife has penetrated into the belly cavity.

As already stated, the lower fillet-cutting knives are formed by a pair of rotary knives 8, which are mounted upon the same axle and the height of which is not changed. The device for setting the knives 8 is shown in Figure 11 and this device operates in such a manner that the knives can cut straight along the back bones of the fish body from the base of the tail to the beginning of the belly cavity. Figure 12 shows diagrammatically the initial position of the knives 8, while Figure 13 shows the cutting position of the knives. According to Figure 12, the distance $a$ between the two knives 8 is constant at that time and is equal to the distance required for properly cutting the smallest possible fish. In the cutting position shown in Figure 13, however, the distance $b$ between the knives 8 is variable and is set as a result of measuring the fish by means of the control-measuring apparatus 5 which operates corresponding to the size of the fish. Thereafter, the knives are held in the required position. Figure 11 shows a strut mechanism for the knives which carries out this setting.

As shown in Figure 11, the strut mechanism includes two pairs of claw couplings 70, 71, for each knife 8. The coupling pairs 70 are located in the middle and are connected by means of a projection 72 with a rod 72a, which is moved by the control-measuring apparatus 5. The rod 72a is moved in the direction of the arrow 72b and by this operation, the knives 8 are set for their cutting position.

As soon as the knives 8 have reached the end of the belly cavity located closest to the tail in the course of the cutting operation, the cam disk 73 will move the roller 74, which is connected by an arm 75a with a shaft 75. The shaft 75 carries arms 75b connected with rods 75c, which are connected with outer couplings 71 by means of projections 71a. Thus, the rotation of the cam disk 73 will be transmitted to the couplings 71 and will move the knives 8 to a position shown in Figures 14 and 15. In these figures, the distance between the knives 8 is indicated by the letter $c$. It is necessary to set the knives 8 to this position so as to provide for the passage between the knives of so-called spans which are the first shoulder portions of the curved rib bones before the end of the belly cavity, including the blood sack. The passage of the fish body is indicated diagrammatically in Figure 14. When the knives 8 have then reached the belly cavity, the same space $c$ between the knives 8 is required to provide free passage through the belly cavity without cutting off the stump or the curved ribs located at the sides and also to avoid the clamping of the stump. This is indicated diagrammatically in Figure 15.

This combined operation of setting the distance between the knives 8 avoids the danger that the knives will become dull by engaging the bones and makes it possible to carry out the cutting operation with the least possible loss of the meat.

Obviously, a similar strut mechanism is provided for the back-cutting knives 9 which are also set to the desired distance from each other by the control-measuring apparatus 5. However, since the back-cutting knives 9 carry out a cut from the tail base to the head of the fish, it is not necessary to quickly enlarge the distance between the knives from the space *b* to the space *c*, as it is illustrated in Figures 13 to 15 with reference to the knives 8. Therefore, as far as the knives 9 are concerned, the distance between them may be increased gradually by the use of correspondingly set steering means corresponding to the gradual increase in the size of the back bones toward the head of the fish. For many types of fish, however, even this gradual increase is not necessary, so that in most cases, the back-cutting knives 8 may be operated solely by the pairs of couplings 70, thus eliminating the couplings 71 altogether.

After the back-cutting operation has been completed the knives 15 carry out the so-called rib cut, as a result of which meat is separated from the curved ribs. It should be noted that this rib cut requires a particularly precise guiding which, furthermore, must correspond precisely to the shape and form of the ribs of the individual fish types, particularly from the side of the belly. Therefore, precisely operating guides are required which must be located upon the side of the back and also upon the side of the belly, with the guide located at the side of the belly serving to a certain extent as a support, while the other guide serves somewhat as a press exerting pressure upon this support. The guides for this rib cut are illustrated in Figures 16 to 19 of the drawings.

Figures 16, 17:
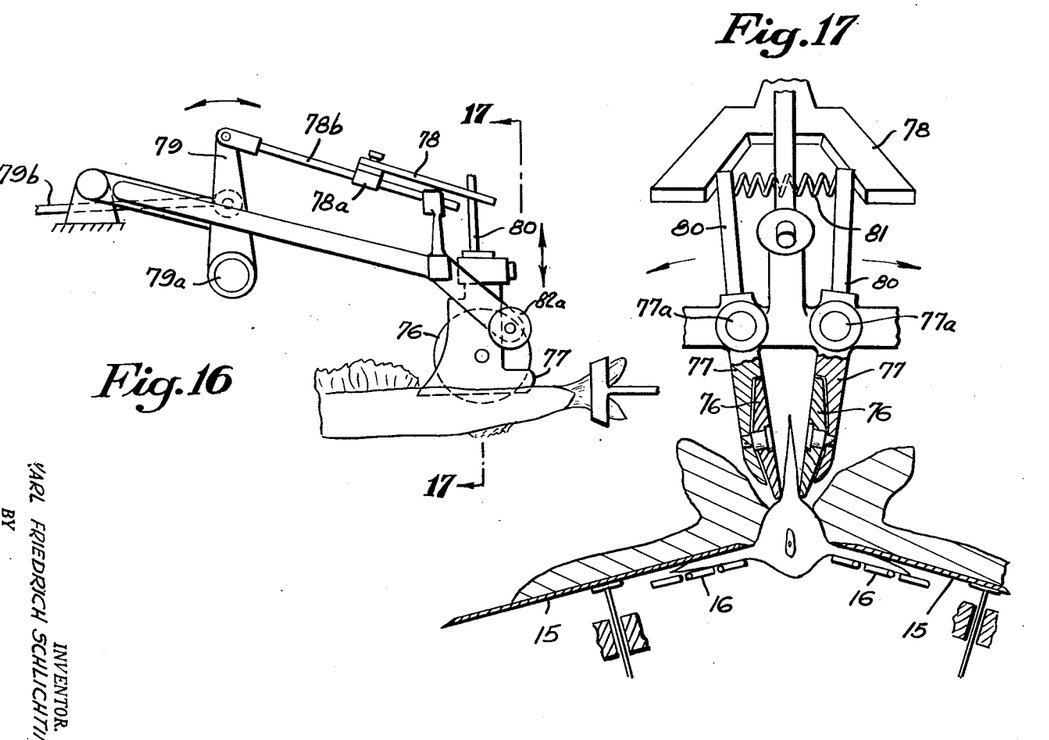
Figure 16 is a plan view showing the bone-cutting device.
Figure 17 is a transverse section through the device shown in Figure 16, along the line 17—17 of Figure 16, on an enlarged scale.

Figures 16 and 17 show the device for guiding the back of the fish. This device includes two disks 76 which are mounted for rotation in sockets 77. The disks 76 engage the stump of the fish as shown in Figure 17 and hold it firmly at the level necessary for a convenient cutting of the ribs. The disks 76 extend only to a short distance beyond their sockets 77 so as to prevent the jamming of the disk 76 between the back bones and the meat and also to prevent the meat from being torn to shreds.

It is apparent that the distance of the disks 76 from one another depends on the size of the fish. This distance is set by a fork-shaped steering member 78, which is connected by a sleeve 78*a* (Figure 16) with a rod 78*b*. The rod 78*b* is pivotally connected with a steering lever 79, which is swingably mounted at 79*a* in the machine frame. The lever 79 is actuated by a rod 79*b*, which is connected therewith.

The fork-shaped member 78 is moved forwardly by the lever 79 and its inner edges engage the arms 80 which are firmly connected with the sockets 77. A spring 81 is located between the upper ends of the arms 80. The arms 80 and the sockets 77 connected therewith are swingably mounted at 77*a*. It is apparent that as the fork-shaped member 78 is moved forwardly, the arms 80 are moved toward each other compressing the spring 81, while the sockets 77 and the disks 76 carried thereby are moved away from each other. The smallest distance between the disks 76 is set by the spring 81 and the outer ends of the fork-shaped member 78.

As the tail clamp is moved throguh this station, this entire device is actuated by means of a roller 82*a* and a cam surface 46 provided upon the carrier 39 for the tail clamp.

Figures 18, 19:
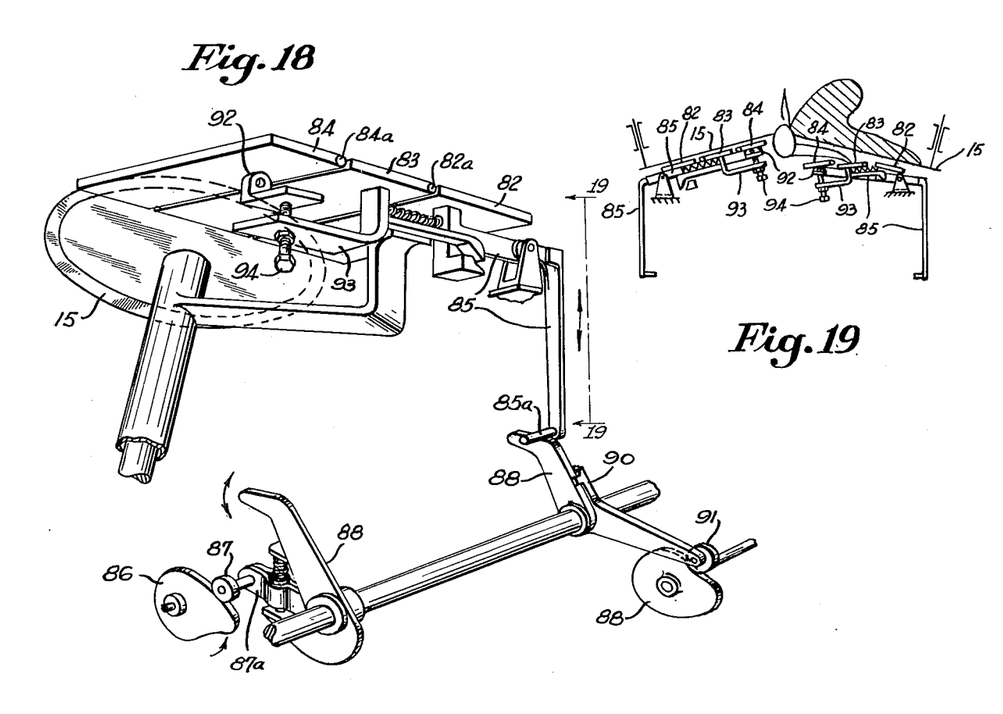
Figure 18 is a perspective view showing the steering device for the supporting means.
Figure 19 is a front view of the device shown in Figure 18, taken along the line 19—19 of Figure 18, on a reduced scale.

The guide 16 for the flaps is indicated diagrammatically in Figure 17 and is shown in greater detail in Figures 18 and 19. The guide 16 is located close to the rib-cutting knives 15, which are inclined in relation to the other. As already stated, the device 16 has for its objective to support the bones from the side of the belly at such a distance from the knives that the cut of these knives takes place closely over the main rbis.

The guide 16 includes two sets of flaps with each set consisting of flaps 82, 83 and 84. The outer flap 82 is stationary, while the middle flap 83 is connected with the flap 82 by a hinge 82*a*, while a hinge 84*a* connects the flap 83 with the flap 84.

The flaps 83 and 84 are operated by a lever 85, which engages the innermost flap 84 and which is operated by two different devices. One of these devices sets the extent of movement of the flaps depending upon the type of the fish, such as, salmon, cod, halibut, etc. This device includes a cam disk 86 engaging a roller 87, which is connected by an arm 87*a* with levers 88. The levers 88 engage pins 85*a* carried by the levers 85. The second device which actuates the lever 85 has for its object to free the flaps when the device has reached the end of the belly cavity located close to the tail end. This time period is, therefore, different for different types of fish. This second device includes a time disk 89, which is set by the control-measuring apparatus 5 and which engages a roller 91 carried by the arm 90. The arm 90 is in engagement with the arm 88, which cooperates with the lever 85.

The device setting the extent of movement of the flaps operates as follows:

The inner flap 84 is first moved downwardly by the steering lever. After the flap 84 has moved the major part of its path, it will strike with the stop 92, carried by set screw 94, which is carried by an angular lever 93. As shown in Figure 18, the lever 93 is firmly connected with the flap 82. Therefore, after the engagement of the member 92 with the member 84, the flaps 84 and 83 will move jointly downwardly to an extent which is determined by the shape of the cam disk 86.

Thus it is apparent that the described device is adaptable to every possible form of the ribs, since it is possible, firstly, to move the flap 84 by itself or, secondly, to swing the two flaps 83 and 84 one after the other; again it is possible to vary the extent of movement of the flap 83 and, furthermore, it is possible to set the time when the flap 83 will be moved by the flap 84 by varying the position of the set screw 94.

After the rib-cutting operation has been completed, the two fillet halves from the tail end to the head are practically cut off from the back bones with a thin strip of meat being located upon each side of the back bone and being firmly connected thereto. A cutting device 18 (Figure 1) is used to cut these strips of meat.

Figure 20:
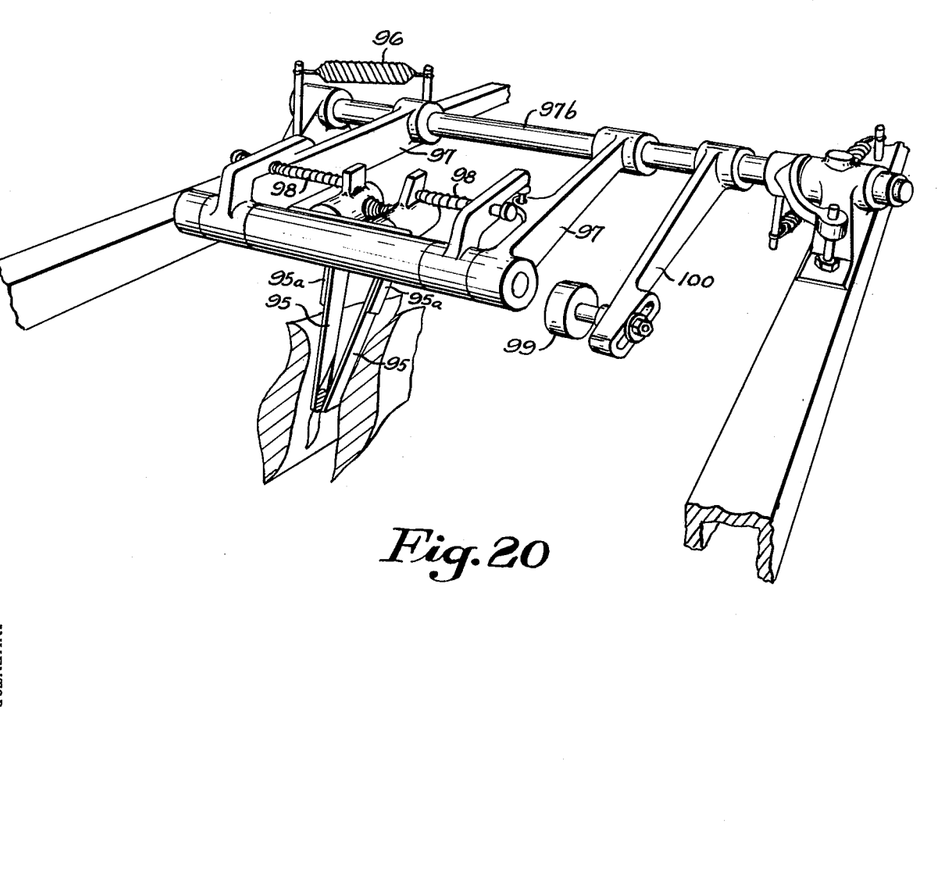
Figure 20 is a perspective view of the fillet-cutting device.

As shown in Figure 20, this cutting device consists of one or more pairs of knives 95 carried by holders 95*a* connected with a rod 97*a*, which is supported by arms 97. A spring 96 has one end connected to an arm 97, while the other end of the spring 96 is connected to the machine frame. The arms 97 are mounted upon a shaft 97*b*. Due to this arrangement, the knives 95 can move jointly away from the movement of the fish body when they encounter excessive resistance. Furthermore, as indicated in Figure 20, the knife supports 95*a* are mounted upon pivots carried by the transverse rod 97*a*. Thus, each of the knives 95 is swingable transversely to the movement of the fish body and can be moved outwardly against the action of a spring 98.

When the tail clamp passes through this station, the knives 95 are swung outwardly by means of the cam member 46 carried by the tail clamp carriage 39 and actuating a roller 99, which is carried by a lever 100, keyed upon the shaft 97*b*. It is apparent that when the cam member engages the roller 99, the movement of the latter will be transmitted through the lever 100 and the shaft 97*b* to the arms 97, which will swing outwardly along with the knives 95. After the passage of the tail clamp, the spring 96 will swing the arms 97 with the knives 95 back to the original operative position.

The two fillet halves are now separated from the stump with the exception of a narrow strip at the tail root. The fillet halves are completely cut off by the fillet cutter 21, shown diagrammatically in Figure 1, and illustrated in detail in Figures 21 and 22. The fillet cutter 21 consists essentially of two circular knives 101, carried by shafts 101*a*, which are supported upon arms 102. The arms 102 are mounted upon a shaft 110 and may swing in relation to the shaft axis, with the result that the knives 101 can swing back and forth along a curve or may carry out a complete rotation.

Figures 21, 22:
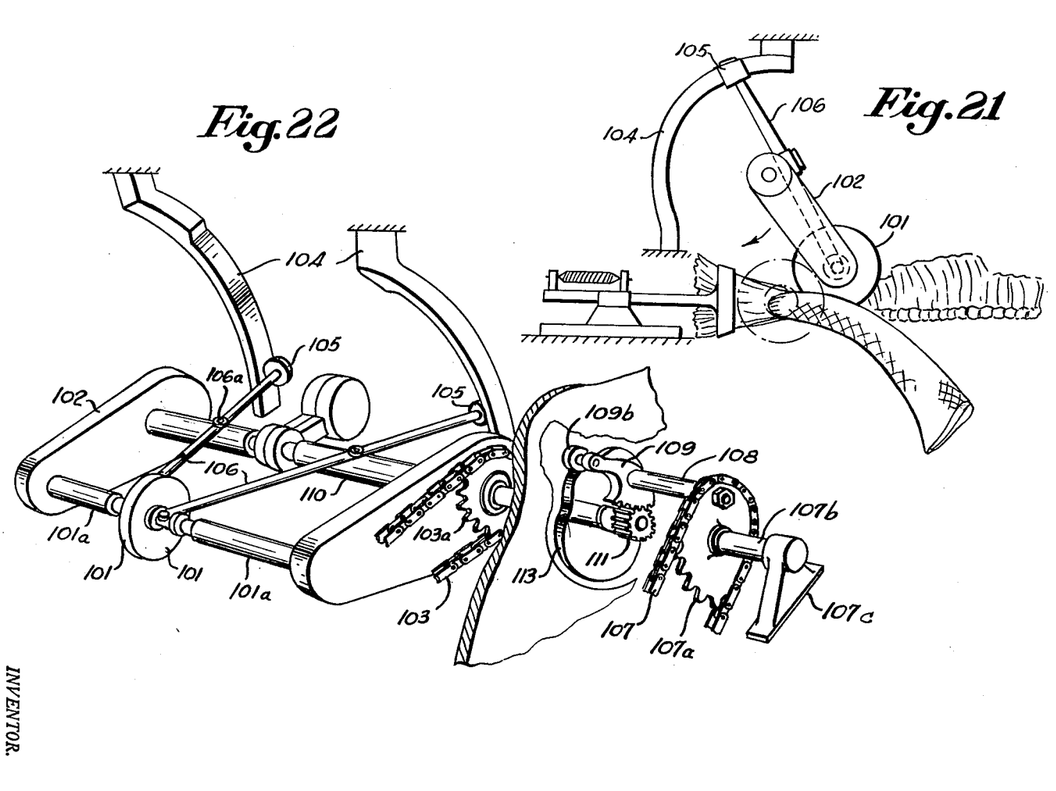
Figure 21 is a side view of the fillet cutter.
Figure 22 is a perspective view showing the device for steering the fillet cutter.

The shaft 110, which drives the knives 101, is actuated by a wheel 103*a*, which is driven by an endless chain 103, which may be replaced by a belt if desired.

The distance of the two knives 101 from each other is set by means of rods 106, which are pivoted intermediate their ends at 106*a* to the shaft 110. The opposite ends of the rods 106 carry rollers 105 which engage cam elements 104. The curved members 104 are carried by the frame of the machine and are so constructed that the knives suddenly move apart to a substantial extent at the end of the cutting operation, thereby pushing away the ends of the fillets.

Since the knives 101 move for a while along with the fish, the cutting takes place through the fact that the knives move ahead of the fish at the time when the path of movement of the fish body forms a tangent to the path of the knives. The swinging of the arms 102 to effect the cutting operation is carried out by a chain or belt drive. In the example illustrated, this drive consists of an endless chain 107 extending over a wheel 107a, which is mounted upon a shaft 107b carried by a bearing 107c. The wheel 107a carries an eccentrically located shaft 108, which is connected to a toothed segment 109. The segment 109 is pivoted at 109a to a roller 109b. The teeth of the segment 109 mesh with the teeth of a pinion 111, which is mounted upon the shaft 110.

The angular acceleration necessary to enable the knife 101 to move ahead of the fish is attained by swinging the segment 109. This is caused by the fact that the roller 109b slides along the edge of a cam disk 113, which deviates from the circular form at one place only.

The two fillet halves are now completely cut off and they are pushed out of the cutting device 18. They slide with their head ends upon the slide plates 19 with the skin side at the top. Then the fillets drop completely upon the slide plates 19 and will slide outwardly. The plates 19 may be combined with endless bands (not shown) which may constitute a transporting device guiding the fillets to a skin-removing machine. It is of advantage that the fillets lie with the skin on top since this is the position required for the removal of the skin by the machine.

The stump attached to the tail fins is removed from the machine at any desired location since, as shown in Figure 4, the steering roller 43 may engage a cam surface 42 causing the opening of the clamp at any time.

Figure 23:
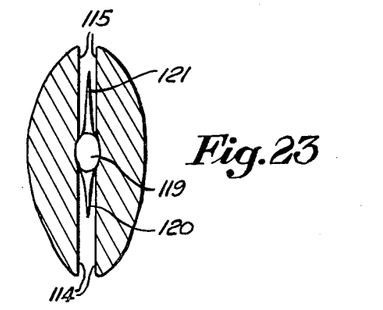
Figure 23 is a diagrammatic transverse section through the fish after it has been cut from the side of the belly.

Figures 23 to 26 of the drawings show the manner in which the various cuts are carried out. These drawings illustrate the fish body in transverse section. Figure 23 is a transverse section through the fish body after the completion of the cut from the side of the belly, the section having been taken at the tail end since the belly cut is carried out only from the tail root to that end of the belly cavity which is closest to the tail. The sectional lines are indicated by the numeral 114 in Figure 23. Figure 23 also shows the back cut at the tail end which is indicated by the cutting lines 115. This completes the operations at the tail end until the final separating cut, which is carried out later.

Figure 24:
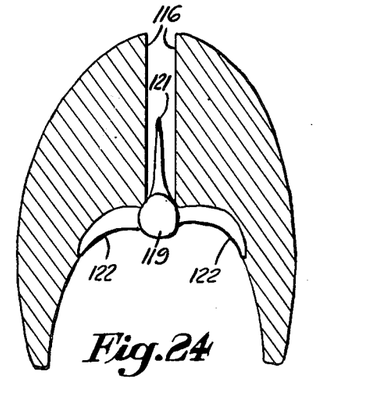
Figure 24 is a diagrammatic transverse section through the fish after it has been cut from the side of the back.

Figure 24 illustrates a section through the fish body at the belly cavity. The back cut is indicated in Figure 24 by the lines 116.

Figure 25:
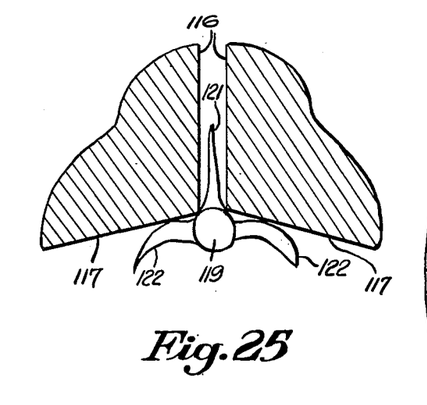
Figure 25 is a diagrammatic transverse section through the fish after its ribs have been cut.

Figure 25 also shows the cutting lines 116 of the back cut. In addition, Figure 25 shows the cutting lines 117 for the rib cut. It is apparent that in order to carry out the rib cut, the belly flaps which hang down in the position shown in Figure 24 must be pulled upwardly and held by guides in the position shown in Figure 25, so that the rib cut can be carried out over the curvature of the ribs 122.

Figure 26:
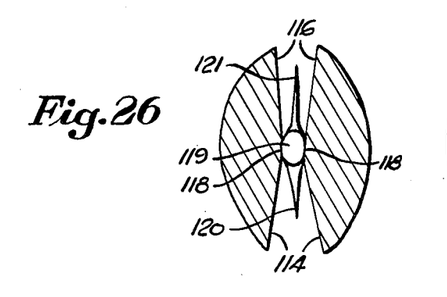
Figure 26 is a diagrammatic transverse section through the fish after the final separating cut.

As shown in Figure 26, after the completion of the belly cut 114, the back cut 115 and 116 and the rib cut 117, it is necessary to carry out the final cut 118 so as to cut off the strips of meat attached to the back bone 119 at opposite sides thereto.

The final separation of the cut-off fillet halves from the tail roots is illustrated in Figure 21.

Throughout the drawings, the main back bone of the fish is indicated by the numeral 119, the belly bones by 120, the back bones by 121 and the rib bones by 122.

It is apparent that the example shown above has been given solely by way of illustration and not by way of limitation and that it is subject to many variations and modifications within the scope of the present invention. All such variations and modifications are to be included within the scope of the present invention.

What is claimed is:

1. In a machine for filleting fish, a support, an endless belt mounted on said support, a fish-receiving trough carried by said support, means associated with said trough for swinging said trough adjacent said belt perpendicularly to the plane of movement of said belt, two side flaps extending toward said belt and carried by said trough, means moving said side flaps toward and away from each other, said side flaps being adapted to form a slot for the passage of the tail of a fish, two horizontal flaps located within said trough one above the other, the lower of said horizontal flaps being adapted to carry the fish engaged by said side flaps, and means connected with said horizontal flaps for steering the same.

2. In a machine for filleting fish, a support, an endless belt mounted on said support and having front and back end portions, a fish-receiving trough carried by said support, means associated with said trough for swinging said trough over the front end portion of said endless belt and perpendicularly to the plane of movement of said belt, two side flaps carried by said trough and extending toward said belt whereby said side flaps form a slot for the passage of the tail of a fish, means associated with said trough for moving said side flaps toward and away from each other, a plurality of tail clamps mounted in spaced relationship upon said belt, each of said tail clamps being adapted to receive a tail of a fish extending through said slot, a control-measuring device associated with said support and located next to said trough adjacent said belt, a belly fin straightener and a belly side cutter associated with said support and located next to said control-measuring device substantially below said endless belt, a back fin straightener and a back side cutter associated with said support and located close to said control-measuring device and substantially above said endless belt, a rib cutter associated with said support and located close to said belly side cutter and said back side cutter adjacent said endless belt, a filler cutter associated with said support and located close to said rib cutter adjacent said endless belt, and fillet removing means associated with said support and located on opposite sides of said endless belt close to the back end portion thereof.

3. A machine for filleting fish in accordance with claim 2, wherein said fillet cutter comprises a pair of rotary knives, means swinging said knives along an arc, and means supporting said swinging means to cause the cutting of a fish fillet when the path of the fish fillet is a tangent to said arc.

4. A machine for filleting fish in accordance with claim 2, wherein said fillet cutter comprises a pair of rotary knives, arms carrying said knives, a shaft carrying said arms, a pinion carried by said shaft, a toothed segment meshing with said pinion, a rotary wheel, means rotating said wheel with a constant speed, said segment being swingably mounted intermediate its ends upon said wheel, and means guiding one end of said segment and constituting a channel having a cam-like non-circular section to provide acceleration of said knives while said one end of the segment is in said section.

5. A machine for filleting fish in accordance with claim 2, wherein said fillet cutter comprises a pair of rotary knives, means swinging said knives along an arc, means supporting said swinging means to cause the cutting of a fish fillet when the path of the fish fillet is a tangent to said arc, and means spreading said knives apart after the completion of the cutting operation to enable them to push off the cut fillet halves.

6. A machine for filleting fish in accordance with claim 5, comprising a plurality of narrow comparatively thin elastic bands located adjacent said knives and receiving the fish fillets pushed off by said knives for transferring them outside of the machine.

7. In a machine for filleting fish, a support, an endless belt mounted on said support, a fish-receiving trough carried by said support, means associated with said trough for swinging said trough over said endless belt and perpendicularly to the plane of movement of said belt, two side flaps carried by said trough and extending toward said belt, whereby said side flaps form a slot for the passage of the tail of a fish, means associated with said trough for moving said side flaps toward and away from each other, a tail clamp adapted to hold the tail of a fish extending through said slot, a carriage carrying said clamp and carried by said belt, a plurality of fish-cutting stations associated with said support and mounted in spaced relationship relative to said belt, a cam edge carried by said carriage, means carried by said fish-cutting stations and comprising rollers engaging said cam edge as the carriage is moved to each fish-cutting station for moving that fish-cutting station to provide passage for the clamp and the fish carried thereby, and means connected with said stations for returning them to their initial positions after the carriage has passed them.

8. In a machine for filleting fish, a support, an endless belt mounted on said support, a fish-receiving trough carried by said support, means associated with said trough for swinging said trough over said endless belt and perpendicularly to the plane of movement of said belt, two side flaps carried by said trough and extending toward said belt whereby said side flaps form a slot for the passage of the tail of a fish, means associated with said trough for moving said side flaps toward and away from each other, a tail clamp mounted upon said belt and adapted to hold the tail of a fish extending through said slot, fillet knives associated with said support and located close to said belt for cutting the fish body from the back side and from the belly side, and a double guiding device associated with said support and located in front of said knives, said double guiding device comprising an upper roof-like back guide, a lower belly guide having the shape of a double roof, means associated with said guides for maintaining said guides at the same levels while the rear portion of a fish body passes therethrough and means associated with said guides and operable when the belly cavity of the fish body reaches the guides for inserting said belly guide into the belly cavity and simultaneously providing resilient yieldable contact between said back guide and the back of the fish body.

9. In a machine for filleting fish, a support, and endless belt mounted on said support, a fish-receiving trough carried by said support, means associated with said trough for swinging said trough over said endless belt and perpendicularly to the plane of movement of said belt, two side flaps carried by said trough and extending toward said belt, whereby said side flaps form a slot for the passage of the tail of a fish, means associated with said trough for moving said side flaps toward and away from each other, a plurality of tail clamps mounted in spaced relationship upon said belt, each of said tail clamps being adapted to receive a tail of a fish extending through said slot, a fish-measuring device associated with said support and located adjacent said belt, means engaging said fish from the back and belly during a first part of the movement of the fish, means operatively connecting said fish-measuring device with said fish-engaging means, a lower pair of knives carried by said support, an upper pair of knives carried by said support, a side pair of knives carried by said support, said pairs of knives being located one behind the other in the path of movement of said fish, said knives making cuts in the fish on opposite sides of the stump from the sides of the belly and of the back as well as rib cuts, means associated with said support and engaging the belly cavity of said fish during a subsequent part of the movement of the fish, whereby said two fish-engaging means and said clamps maintain said fish upon its belly in a stretched condition in the course of its movement, means operatively connecting said fish-measuring device with said lower pair of knives for adjusting the position of said lower pair of knives, other knives associated with said support for cutting meat strips and fillet strips after said cuts are made by said pairs of knives, and fillet guides associated with said support for removing the cut fillets.

References Cited in the file of this patent

UNITED STATES PATENTS

| | | |
|---|---|---|
| 1,078,719 | Cleveland | Nov. 18, 1913 |
| 1,639,976 | Barry | Aug. 23, 1927 |
| 1,861,863 | Hunt | June 7, 1932 |
| 1,885,829 | Hunt | Nov. 1, 1932 |
| 1,889,919 | Hunt | Dec. 6, 1932 |
| 2,311,176 | Hutton | Feb. 16, 1943 |
| 2,381,560 | Savrda | Aug. 7, 1945 |
| 2,400,118 | Hunt | May 14, 1946 |
| 2,540,990 | Oss | Feb. 6, 1951 |
| 2,577,686 | Hunt | Dec. 4, 1951 |